United States Patent
Eder et al.

(10) Patent No.: US 10,029,412 B2
(45) Date of Patent: Jul. 24, 2018

(54) PROCEDURE FOR RIVETS, RIVETING TOOL, RIVETING MACHINE AND AIRBAG COMPONENT

(71) Applicant: KIEFEL GmbH, Freilassing (DE)

(72) Inventors: Josef Eder, Freilassing (DE); Michael Lorenz, Salzburg (AT); Andreas Dandl, Laufen (DE)

(73) Assignee: KIEFEL GMBH, Freilassing (DE)

( * ) Notice: Subject to any disclaimer, the term of this patent is extended or adjusted under 35 U.S.C. 154(b) by 0 days.

(21) Appl. No.: 14/612,314

(22) Filed: Feb. 3, 2015

(65) Prior Publication Data

US 2015/0217507 A1 Aug. 6, 2015

(30) Foreign Application Priority Data

Feb. 3, 2014 (DE) .......................... 10 2014 001 239
Jan. 22, 2015 (DE) .......................... 10 2015 000 625

(51) Int. Cl.
*B60R 21/16* (2006.01)
*B29C 65/60* (2006.01)
(Continued)

(52) U.S. Cl.
CPC ............ *B29C 65/60* (2013.01); *B29C 65/606* (2013.01); *B29C 66/21* (2013.01); *B29C 66/8161* (2013.01); *B29C 66/81463* (2013.01); *B29C 66/9221* (2013.01); *B29C 66/92211* (2013.01); *B29C 66/92451* (2013.01); *B60R 21/20* (2013.01); *G01L 1/04* (2013.01); *B29C 65/10* (2013.01); *B29C 65/18* (2013.01); *B29C 66/0242* (2013.01); *B29C 66/0342* (2013.01); *B29C 66/3494* (2013.01); *B29C 66/50* (2013.01); *B29C 66/929* (2013.01); *B29C 66/9241* (2013.01); *B29L 2022/027* (2013.01);
(Continued)

(58) Field of Classification Search
CPC .............. B60R 21/16; B29C 66/81463; B29C 66/92211; B29C 66/92451; B29C 66/9221; B29C 66/9241; B29C 66/929; B29C 65/06; B29C 65/10
See application file for complete search history.

(56) References Cited

U.S. PATENT DOCUMENTS 6,014,804 A * 1/2000 Lulay et al. .................... 29/715
6,041,493 A * 3/2000 Donhauser .................... 29/715
(Continued)

FOREIGN PATENT DOCUMENTS

CN 201124213 Y 10/2008
DE 10164005 A1 7/2003
(Continued)

OTHER PUBLICATIONS

Siemens AG, Apr. 10, 1991, EP0421019 translation.*

*Primary Examiner* — Faye M Fleming
(74) *Attorney, Agent, or Firm* — Mark M. Friedman

(57) ABSTRACT

A method of riveting using a plastically deformable plastic rivet is provided. The method includes positioning the plastic rivet in front of the rivet on a component, of a motor vehicle, and deforming the rivet by a riveting die by applying a riveting force, such that a rivet holds the component wherein the rivet is with a rivet dynamometer and the riveting force is measured and a rivet is set with a predetermined breaking point.

23 Claims, 2 Drawing Sheets

(51) Int. Cl.
  *B29C 65/00* (2006.01)
  *B60R 21/20* (2011.01)
  *G01L 1/04* (2006.01)
  *B29C 65/10* (2006.01)
  *B29C 65/18* (2006.01)
  *B29L 22/02* (2006.01)
  *B29L 31/30* (2006.01)

(52) U.S. Cl.
  CPC .. *B29L 2031/3005* (2013.01); *Y10T 29/49943* (2015.01); *Y10T 29/5377* (2015.01)

(56) References Cited

U.S. PATENT DOCUMENTS

| | | | | |
|---|---|---|---|---|
| 2001/0030078 A1* | 10/2001 | Jones et al. | ................ | 181/150 |
| 2006/0248705 A1* | 11/2006 | Opper | ................ | 29/525.06 |
| 2007/0085305 A1* | 4/2007 | Feller et al. | ................ | 280/728.2 |
| 2014/0049068 A1* | 2/2014 | LaVere | ................ | B60R 21/231 |
| | | | | 296/187.05 |

FOREIGN PATENT DOCUMENTS

| | | |
|---|---|---|
| DE | 10038158 B4 | 4/2004 |
| DE | 102004021887 A1 | 12/2005 |
| EP | 0 421 019 | 4/1991 |
| EP | 1 600 280 | 11/2005 |
| JP | 2003 300252 | 10/2003 |
| JP | 2008 168538 | 7/2008 |
| WO | 2014028753 A1 | 2/2014 |

\* cited by examiner

PROCEDURE FOR RIVETS, RIVETING TOOL, RIVETING MACHINE AND AIRBAG COMPONENT

FIELD AND BACKGROUND OF THE INVENTION

The invention deals with a procedure for rivets, a riveting tool, a riveting machine and a part of the airbag.

Plastic rivets are used extensively since a long time, especially in the automobile area relevant here: For the rivets, a riveting is done to a component. For this purpose, a workable plastic-rivet is located in the part, where the plastic rivet is cylindrical in its simplest form and sticks out from the part, rectangular in an ideal scenario and however, it is preferable in one piece with the part or a plastic part installed there.

For fixing the riveting, this is managed by opening it or an edge under a head area of the rivet. The rivet is finally deformed plastically, starting from the head area, that is its free end, by using a rivet stamp. For instance, the head is pressed in a mushroom-shaped manner. By deforming the rivet stamp, the riveting is fixed to the component.

An approved riveting process is revealed in the DE 100 38 158 B4: The rivet stamp is arranged there in a current guide sleeve. The sleeve is at the starting point with the rivet stamp above the rivet, which juts through a notch in the riveting. Initially, the sleeve is placed at the rivet and a warmed air flow is directed to the rivet through the sleeve for preheating. The rivet which is preheated in this manner is finally deformed with a heated rivet stamp. The heating cartridge in the rivet stamp is then switched off and a strong cooler airflow is directed through the sleeve, so that the rivet stamp and the rivet are cooled down. After cooling, the rivet stamp is hoisted upwards through the rivet stamp with the sleeve. Then, the binder is ideally also embodied at the same time by the sleeve, lifted from the parts to be riveted with each other.

The task to make an improvement or an alternative available to the status of technology underlies the fabrication.

SUMMARY OF THE INVENTION

According to an initial aspect of the fabrication, this task tackles a process for riveting, with the help of a plastically deformable plastic-rivet, where the plastic rivet is arranged with the rivet before, to a part, especially to a part of an automobile and the rivet is deformed by a rivet stamp by exerting a riveting force and thus a riveting to the part is retained, where this process signifies that the rivet stamp is equipped with a riveting dynamometer and that the riveting force is measured.

The following is explained conceptually:

It is explicitly referred to the fact that in the context of the patent application present here, undefined articles and numerical data such as "one", "two" etc. should be understood regularly as the least specifications, that is, as "at least one . . . ", "at least two . . . " etc., provided something is not directly resulted from the respective context or it is obvious for the expert, that only "exactly one . . . ", "exactly two . . . " etc is meant there, or it can be.

The "part of an automobile", which is genre-specific for the main purpose of use here, can either be a technical as well as a decorative part. It can especially deal with an interior lining of a power vehicle, especially a concealed part, especially with a lining with a leather grain; a special design of the fabrication is provided, which is riveted to a safety-related part in this manner, especially to a part with an airbag in it or under it.

The "rivet stamp" is the part in the tool, which is arranged for the purpose of making the deformation of the rivet through direct physical contact, specifically through an entrance of the rivet stamp in the protruding rivet, through which the rivet is deformed by force.

Measuring the riveting force should be done through the "rivet dynamometer". With this, it is to be understood that at least a force in at least a direction in space during the riveting process is measured.

For instance, the maximum force can be measured, which appears during the riveting process. Before contacting the rivet stamp with the rivet and after withdrawing the rivet from the deformed rivet, the riveting stamp does not have any force, except for the force which has an effect on it from its own gravity. From starting the contact between the rivet stamp and the rivet to be deformed, till the removal of the riveting die from the deformed rivet, a riveting force is created. It is thinkable, for example, to measure the maximum riveting force in this period as the "riveting force".

An alternative or cumulative solution is to determine several discrete values or even a permanent measurement over a period during the riveting.

While the maximum values can provide information particularly on any material risk, the control of forces during the process can be influenced, targeted to the intramolecular quality of the deformed rivet.

So the danger is known in the status of technology, for example, that a rivet is either broken due to very high rivet forces or, for example, a refinement can be identified in the so-called good side of the part. Since the specific components of motor vehicles usually already have a fairly high value at the time of riveting, the device makes it possible to avoid such damage. A variety of riveting stamps are preferably arranged on a tool and the rivet force of at least two rivet stamps, preferred by all the rivet stamps, is measured individually.

Tools for riveting are generally set at several points of riveting points, for example, to connect the inner lining of a motor vehicle part to an underlying part, also made of plastic or sheet metal. Especially with two relatively flat parts to be joined, usually a number of rivets is set along the perimeter of the flat parts.

By the individual measuring the rivet forces, it is possible to give the rivets individual characteristics. For example, a rivet is set up behind a sensitive spot of the good side, but no safety function has to be installed with less riveting force and deformed, whereas connections can be connected either behind less sensitive areas of the good side or with mechanical importance of higher riveting force.

Specifically with regard to the safety-relevant components, it is conceivable that with the process, a rivet is set with a predetermined breaking point A "breaking point" is a structural weakening of the connection between the part and the riveting, mostly caused by a structural weakening in the rivet itself, for example in cross-section of the rivet.

A breaking point can be achieved, that is riveted with a particular riveting force, either by causing only a slight deformation of the rivet so that the riveting must cause only a slight reshaping of the deformed rivet, to disengage from the component; or the rivet is deformed with a particularly large rivet, so that when there is a detaching force of the rivet on the deformed rivet, it tends to break easily; or it is caused with a very fast or very slow deformation of a more brittle material behavior of the deformed rivet, so that it is destroyed upon application of a pulling force.

Regardless of whether one predetermined breaking point is present or not, the riveting force can be logged. This allows, for example, a quality assurance for the set rivet, especially for a variety of rivets to the connection.

The rivet, for example, includes a seam provided to burst in a motor vehicle, especially an airbag seam. For such a seam, it is particularly important that the rivet or the majority rivets give way in applying a predefined power, so for example a triggering airbag certainly tears the seam and exits the interior trim part or outer covering part of the motor vehicle, to protect the occupants or passengers.

It has already been pointed out that the motor vehicle parts already have a fairly high pre-processing and thus very high value for most riveting. This is especially seen when, for example, there is already a lamination or another part which is used, for example, a speaker grille, speaker, door handle, a lamp, a door, a subject and/or a control knob.

For prototype attempts, the inventor of components, specifically for motor vehicles, primarily uses rivet forces of less than 500 N, which has been found to be advantageous, especially of less than 300 N, preferably from about 200 N.

If a maximum allowed riveting force is defined, then it is suggested that it is logged and preferably automatically, in which a maximum permissible riveting force of 120 is not exceeded.

A "maximum riveting force" should be primarily used in such a way in the process, that the method accesses a controller on the tool or a tool-supporting tool station or a system, wherein the controller itself has access to a data memory, and wherein the data store has the permissible maximum force of either a flat rate for all rivets or individually for one or more rivets saved in it. The force can either be provided from the plant, or it can be determined or entered directly for example, by the user.

Logging, which has not exceeded the maximum riveting force, can be of high importance, especially for safety-related components.

For example, a motor vehicle manufacturer or a vehicle supplier, in this way, ensures that the safety-relevant components, especially components with bursting seams for airbags in an emergency actually allow the functioning of the airbag.

It is preferably seen that the riveting process is interrupted when a maximum allowed riveting force has been exceeded.

The "pause" can either be that the stamp stopped and is not moving into the rivet, so that the rivet remains set in the deformed state, but the device can still be used normally. It can, for example, be entered in an optical device or supported by individual study; an alternative may provide that parts in which the maximum allowable rivet force has been exceeded, are automatically scrapped.

It has already been explained that the maximum riveting force to set the rivet can be customized, for example from rivet to rivet, or from a plastic charge to plastic charge. The house temperature, for example, can contribute to variability of the maximum. allowed riveting force.

It is therefore considered to be advantageous if in a preceding step, the maximum allowed riveting force is determined for setting the rivet only, for example by visual inspection of the test rivet processes, wherein in particular a number of test rivet processes can be performed, and wherein the rivet forces in the test rivet processes can be performed, for example, it can be set automatically in machine-defined steps or manually.

This allows the visual observation of the good side of the component to be performed by simply viewing by an experienced user. If the user can reduce the maximum allowed riveting force for one rivet or rivets for a crowd or for the riveting tool as a whole, it can be ensured that the depressions do not appear on the good side.

For safety-related parts with predetermined breaking points, it makes sense to set the maximum allowable riveting force lower than other rivets in the same tool.

The most important riveting force is the force in the longitudinal direction of the riveting stamp, so in any case, those directions along which the riveting stamp is moved into the rivet to be deformed. This corresponds to a preferred embodiment of the riveting stamp of the longitudinal direction of the riveting stamp themselves, such as in DE 100 38 158 B4.

The force along the direction of riveting, i.e. the direction of movement of the riveting stamp in the rivet to be deformed into it, is that force which provides most of the deformation of the rivet and therefore deserves the greatest attention.

The riveting force can be most easily measured by a holder of the riveting stamp in the tool.

In order to achieve individual adjustment of the riveting force for a tool with multiple riveting stamps, it can be seen that the individual riveting has moved along its longitudinal axis and been refixed in the adjusted position, so that when there is an identical movement of the tool, the riveting force either increases when the rivet has been moved further in the direction of attack, or falls if the riveting has been adjusted against the direction.

It has already been pointed out that it may be useful to allow different maximum allowed rivet forces for different rivets in a riveting tool, for example, to set variously shaped rivets and/or for setting rivets in different materials on the component and/or different functions of the component.

Preferably, the method is used as described above, which is the same way as described in DE 100 38 158 B4, the entire disclosure of which is hereby incorporated by reference as disclosed herein.

According to a second aspect of the present invention, the object is achieved by a rivet tool with a riveting for a plastically deformable plastic rivet, particularly adapted to perform a method as described above, wherein the riveting tool thereby indicates that there is a riveting dynamometer for measuring a particular axial riveting force.

As the "riveting" can be understood in a narrow consideration of riveting with its holder and a sleeve for example, that such a component, which is repeatedly used in a system in a collective tool; or it can be understood including the collection tool, i.e. for example a rather flat tool, which supports a variety of riveting units with rivet stamps.

The "rivet dynamometer" can be, for example, a dynamometer, or in a simple form, it can be arranged to a strain gauge. Generally, it is a technically reliable embodiment, when the rivet dynamometer detects a deformation of a measuring unit and a data controller is connected to the rivet dynamometer, for example via a power connection, for example, a modified electrical resistance is measured.

Preferably, a data line is provided between the rivet dynamometer and the controller, especially in the form of an electrical cable.

According to a third aspect of the invention, a riveting machine is proposed, which is configured for performing a method described above and/or comprising a riveting tool as described above. Such a riveting may have especially hydraulically or pneumatically actuated parts, such as retaining means for the component and/or the rivet, and/or it can be provided with transport for moving component and/or rivet.

It is understood that the advantages of a riveting have an effect immediately, especially on an airbag component when the airbag component which has a variety of plastic rivets, the plastic rivets are deformed with different riveting forces.

BRIEF DESCRIPTION OF THE DRAWINGS

The invention is explained below using an exemplary embodiment with reference to the drawing. The following is displayed there.

DETAILED DESCRIPTION OF THE INVENTION

Figure 1:
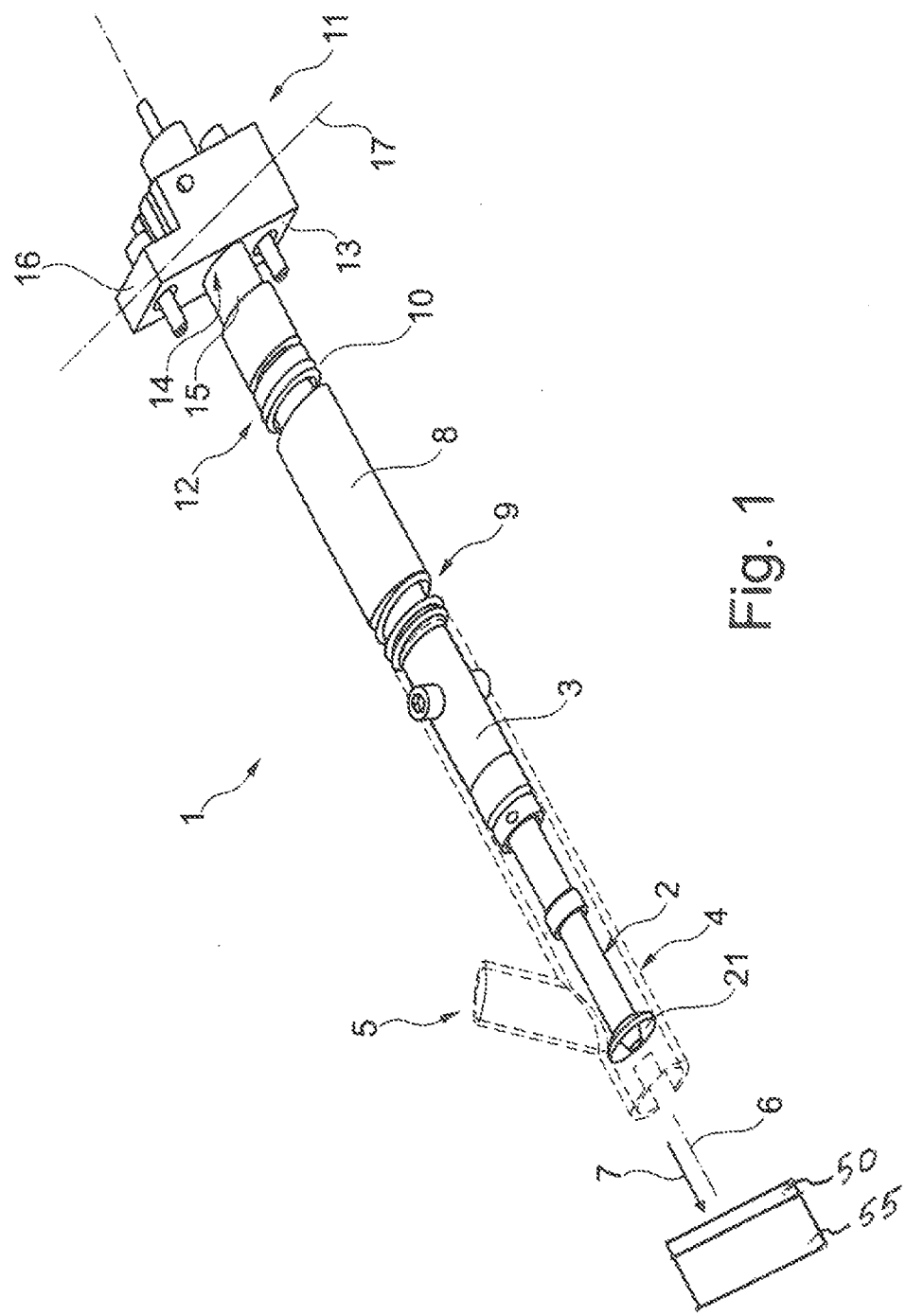
FIG. 1 is a semi-transparent representation of a perspective view of a riveting unit with a holder and showing the rivet and component schematically, in accordance with one embodiment of the present invention.
Figure 2:
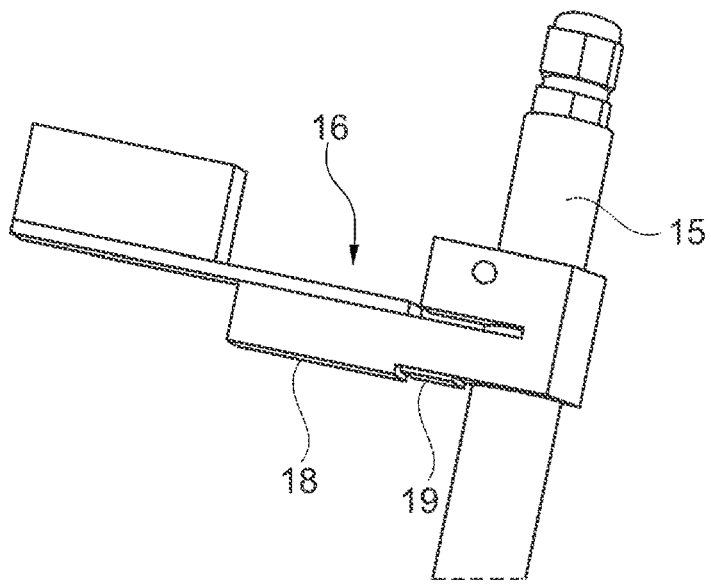
FIG. 2 is a schematic perspective view of a modified representation as detail of the holder from a different perspective, in accordance with one embodiment of the present invention
Figure 3:
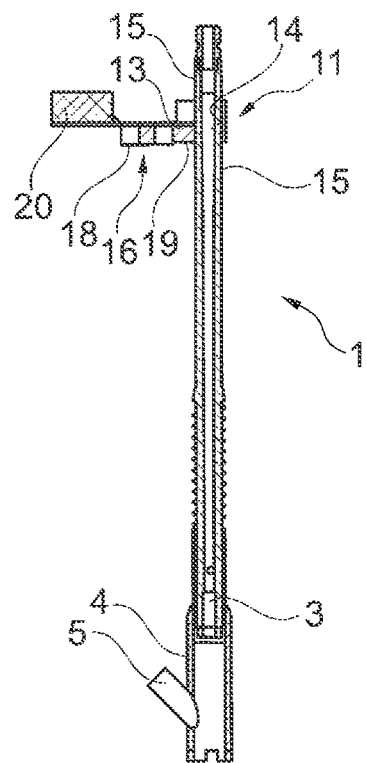
FIG. 3 is a longitudinal section showing the riveting unit with the holder, in accordance with one embodiment of the present invention.

The riveting unit 1 in the figures consists essentially of the riveting stamp 2 (not shown in FIG. 3), which is supported on a rivet stamp socket 3, wherein in the riveting stamp 2, an air guide sleeve 4 is arranged in an advantageous application of revelation from DE 100 38 158 B4, which serves as a hold-down during the riveting.

The air guide sleeve 4 has a connection port 5 for supplying cooling air to the riveting stamp 2.

The riveting unit 1 is constructed stretched along a longitudinal direction 6 and substantially cylindrical.

Along the longitudinal direction 6 is more in the direction of application 7, i.e. in practice, usually lower end of the riveting unit 1, the riveting die 2 with its air guide sleeve 4.

Contrary to the direction 7 of the cylindrical body, it is continued in a spring element 8, which is configured resiliently to a first coil spring 9 and a second coil spring 10 in the longitudinal direction 6 of the riveting unit 1, so that the rivet stamp socket 3 can be added with the attached riveting stamp 2 and the also mounted air guide sleeve 4 axially under construction or dismantling of a linear spring force in holder 11.

There is a threaded ring 12, in which the function of a spindle can lengthen or shorten riveter 1 axially so that (not shown) a once given installation situation of the holder 11 on a tool in a riveting between the spring element 8 and the holder 11 sets smaller rivet forces.

The holder 11 consists essentially of a retaining body 13, which is on one hand, a cylindrical receptacle 14 for the cylindrical body 15, which then continues into the spring element 8 and ultimately towards the riveting stamp 2 in the direction of attack 7; on the other hand has the support flange 13 by a projection 16 for placement on the tool carrier.

In the embodiment chosen here, the projection 16 is in applying a longitudinal force along the direction of attack 7, in practice as a force opposite to the direction of attack 7, prone to bend around a bending axis 17. This means that upon application of a riveting force, a material expansion takes place at a lower side 18 of the projection 16. There is a strain gauge 19 arranged, that registers the extension of the underside 18 of the projection 16 and is also connected to a data attached to the riveting unit 1 amplifier 20.

In use, the riveting unit 1 of the tool carrier travels with a variety of riveting units 1 along the direction of attack 7 against the rivets 50 of a component 55 and sets the riveting stamp 2 on the rivet 50. The further forward movement of the tool holder in the direction of attack 7, the riveting die 2 are driven into the rivet 50, thus deforming the rivet 50.

A flat plate bending 21 ensures that the plastically deformed expectant material of the plastic rivet 50 is placed flat on the outside of the two connected components, i.e. on the side of the rivet 50, which is located on the component 55.

During deforming, the pressure acting axially against the direction of application 7 is to be determined in the force of the riveting unit 1 via the deformation at strain gauge 19, in the pre-amplified to be transmitted by the strain gauge 19 at the data amplifier 20, and then a controller (not shown) on the tool station is fed.

Finally, a logging and/or a changed setting the rivet forces can be done.

It is understood that the embodiment presented here is only one of numerous possible designs.

The scope of the present patent application is determined solely by the claims, while the embodiment is intended only to illustrate one possible embodiment of the invention.

What is claimed is:

1. A method of riveting using a plastically deformable plastic rivet, the method comprising positioning a riveting unit in front of a rivet, the rivet positioned on a component of a motor vehicle, and deforming the rivet with a riveting die of the riveting unit by applying a riveting force, such that the rivet holds the component, wherein the riveting force is measured with a rivet dynamometer and said rivet is set with a predetermined breaking point.

2. The method of claim 1 wherein a variety of rivet stamps are arranged on a tool and the riveting force of at least two rivet stamps is measured individually.

3. A method according to claim 1, wherein the rivet is provided in a motor vehicle with a burst seam which includes an airbag seam.

4. A method according to claim 1, further comprising logging the riveting force and carrying out a quality assurance for said rivet.

5. A method according to claim 1, wherein an interior trim component of an automotive vehicle or an outer panel of a motor vehicle part is processed in an already laminating system state.

6. A method according to claim 1, wherein said riveting force is less than 500 N.

7. A method according to claim 6 wherein said riveting force does not exceeds a maximum riveting force.

8. A method according to claim 1, further comprising interrupting the riveting process when a maximum allowable riveting, force has been exceeded.

9. A method according to claim 1 further comprising determining a maximum riveting force for the set rivet.

10. A method according to claim 9 wherein the maximum permissible riveting force is determined by an optical assessment and wherein the maximum allowable riveting force is reduced accordingly.

11. The method of claim 9, wherein the maximum permissible riveting force is determined based on an assessment of a rivet breaking point and wherein said maximum allowable riveting force is reduced in accordance with said breaking point.

12. A method according to claim 1, wherein the riveting force is measured on a holder of a riveting stamp on a tool.

13. A method according to claim 1, wherein the method of riveting is performed with a hot rivet process including (i) first heating of the rivet by directing a flow of gas to the rivet, (ii) then deforming the rivet with a heated rivet stamp located inside the riveting unit, (iii) and stopping the heating and directing a cool gas flow through the sleeve to cool the rivet and rivet stamp.

14. A riveting tool with riveting for a plastically deformable plastic rivet, adapted to perform a method according to any of the preceding claims, wherein riveting has a rivet dynamometer for measuring an axial riveting force.

15. A riveting tool according to claim 14, wherein a data line is provided, with leads to a controller so that the controller can evaluate the riveting force during riveting.

16. A riveting machine adapted for performing a method according to claim 1.

17. A riveting machine ac cording to claim 16, with a riveting tool, a force sensor and a controller.

18. A riveting machine adapted for performing a method according to claim 14.

19. A method of riveting using a plastically deformable plastic rivet, the method comprising positioning a riveting unit in front of a rivet, the rivet positioned on a component of a motor vehicle, and deforming the rivet by a riveting die by applying a riveting force, such that a rivet holds the component wherein the riveting three is measured with a rivet dynamometer and wherein an individual riveting stamp is longitudinally adjusted with respect to its longitudinal axis to achieve a riveting force modification.

20. A method of riveting using a plastically deformable plastic rivet, the method comprising positioning a riveting unit in front of a rivet, the rivet positioned on a component of a motor vehicle, and deforming the rivet by a riveting die by applying a riveting force, such that a rivet holds the component wherein the riveting three is measured with a rivet dynamometer and wherein the different maximum allowable rivet forces for different rivets are approved to set variously shaped rivets and/or for setting rivets in various materials on the component.

21. A method of riveting using a plastically deformable plastic rivet, the method comprising positioning a riveting unit in from of a rivet, the rivet positioned on a component of a motor vehicle, and deforming the rivet by a riveting die by applying a riveting force, such that a rivet holds the component wherein a variety of rivet stamps are arranged on a tool and the riveting force of at least two rivet stamps is measured individually.

22. A method of riveting using a plastically deformable plastic rivet, the method comprising positioning a riveting unit in front of a rivet, the rivet positioned on a component of a motor vehicle, and deforming the rivet by a riveting die by applying a riveting force, such that a rivet holds the component wherein a maximum riveting force for the rivet is determined, and the maximum permissible riveting force is determined by an optical assessment of a good side and the maximum allowable riveting force is reduced.

23. A method of riveting using a plastically deformable plastic rivet, the method comprising positioning, a riveting unit in front of a rivet, the rivet positioned on a component of a motor vehicle, and deforming the rivet by a riveting die by applying a riveting force, such that a rivet holds the component wherein a maximum riveting force for the rivet is determined and the maximum permissible riveting force is determined based on an assessment of a rivet breaking point by the maximum riveting force and is reduced to the breaking point or previous damage to the breaking point.

* * * * *